H. W. MAURER & F. K. TAYLOR.
PRESSURE INDICATING AND REGULATING DEVICE.
APPLICATION FILED APR. 5, 1915.
1,167,421.
Patented Jan. 11, 1916.
2 SHEETS—SHEET 1.
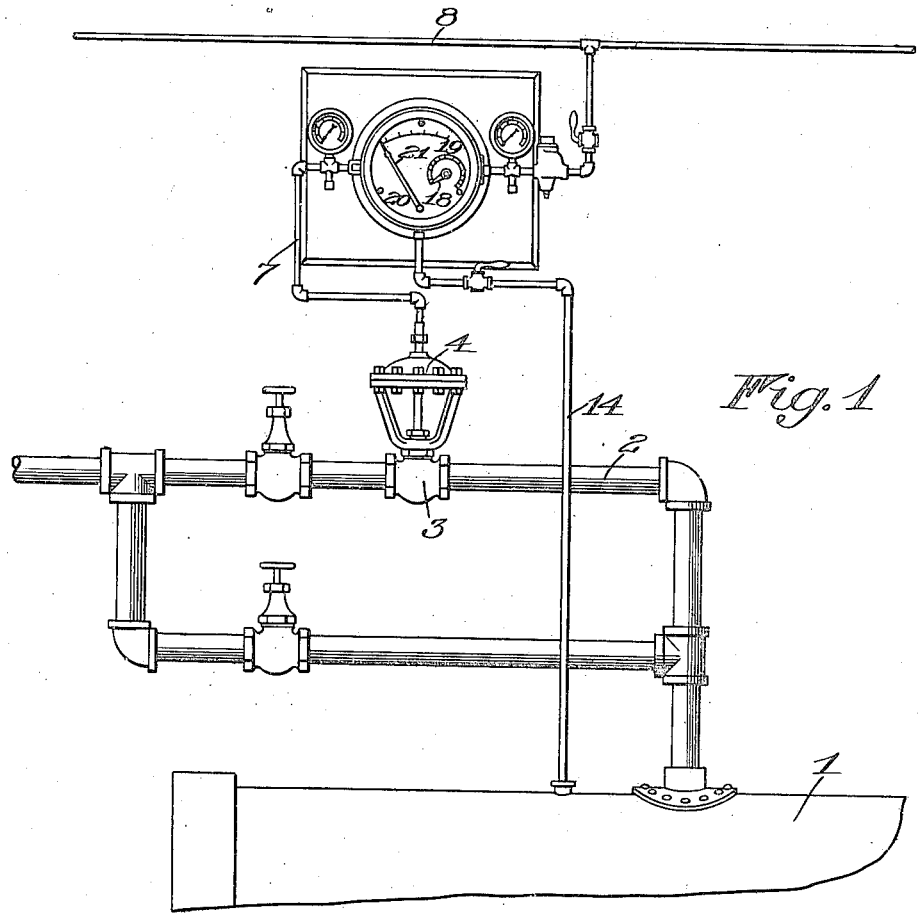
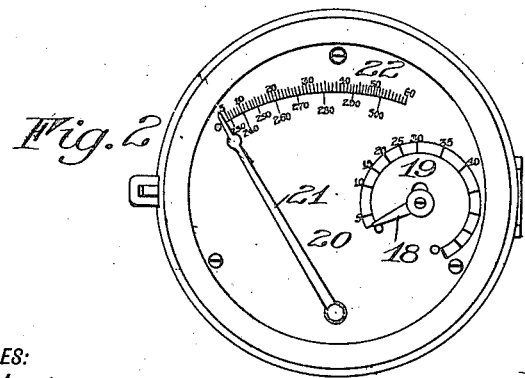
WITNESSES:
Nelson H. Copp
Walter D. Payne
INVENTORS
Henry W. Maurer
Fred K. Taylor
BY
their ATTORNEYS

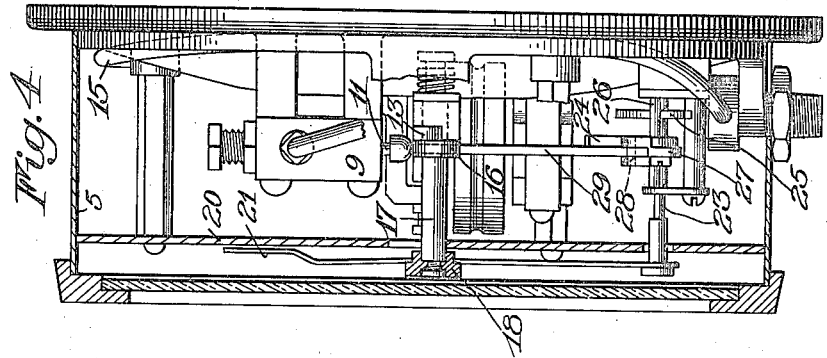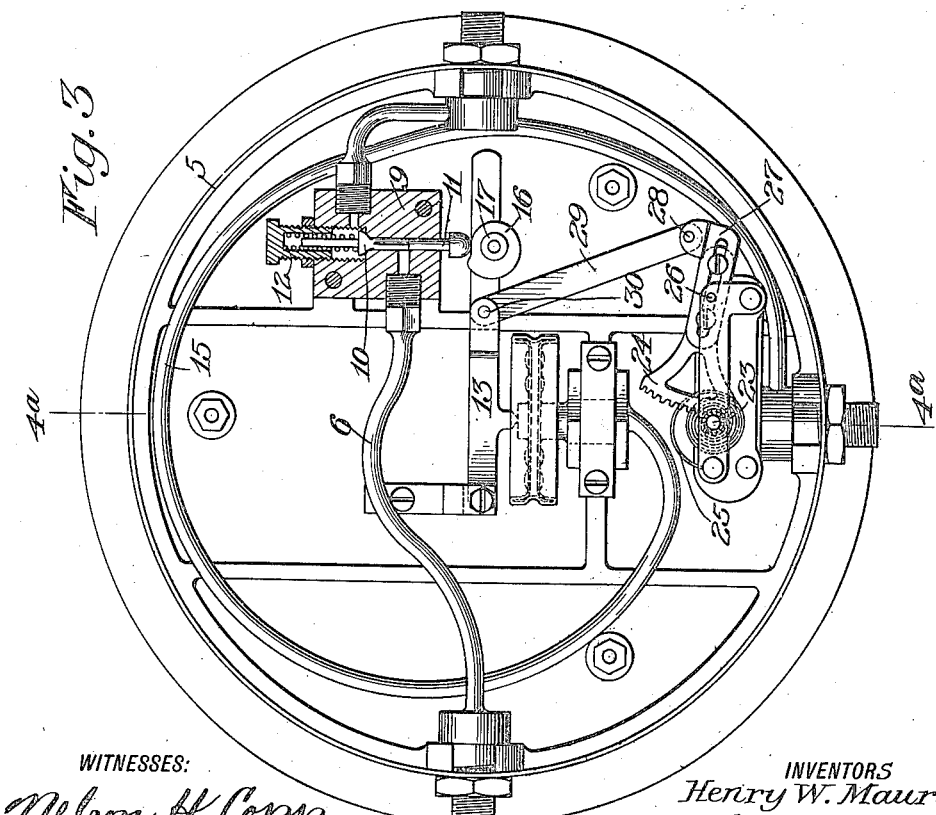

UNITED STATES PATENT OFFICE.

HENRY W. MAURER AND FRED K. TAYLOR, OF ROCHESTER, NEW YORK, ASSIGNORS TO TAYLOR INSTRUMENT COMPANIES, OF ROCHESTER, NEW YORK, A CORPORATION OF NEW YORK.

PRESSURE INDICATING AND REGULATING DEVICE.

1,167,421.  Specification of Letters Patent.  Patented Jan. 11, 1916.

Application filed April 5, 1915. Serial No. 19,163.

*To all whom it may concern:*

Be it known that we, HENRY W. MAURER and FRED K. TAYLOR, both of Rochester, in the county of Monroe and State of New York, have invented certain new and useful Improvements in Pressure Indicating and Regulating Devices; and we do hereby declare the following to be a full, clear, and exact description of the same, reference being had to the accompanying drawings, forming a part of this specification, and to the reference-numerals marked thereon.

The invention has for its purpose to provide a novel organization of parts for regulating pressure within a tank or chamber, at the same time giving an indication of the pressure in a manner that assures a quick and sensitive response to the pressure as well as accurate results.

Another and important object of the invention resides in providing a unitary structure that can be manufactured readily, and by combining the regulating and indicating elements into a single unit, reduces the cost of manufacture and affords an arrangement that requires a minimum space in its actual application.

To these and other ends the invention consists in certain improvements and combinations of parts, all as will be hereinafter more fully described, the novel features being pointed out in the claims at the end of the specification.

In the drawings: Figure 1 is a view in elevation showing the application of the invention to a pressure tank; Fig. 2 is a plan view of the device; Fig. 3 is a plan view of the mechanism, the indicating plate being removed, with parts appearing in section, and Fig. 4 is a sectional view on the line 4ª—4ª of Fig. 3.

Similar reference numerals in the several figures indicate the same parts.

In the application of the invention as herein disclosed, which is intended for purposes of illustration merely and does not limit the invention to any specific arrangement, 1 designates a tank or container carrying fluid under pressure, such as steam or otherwise, supplied from a pipe 2 controlled by a main valve 3, actuated by a fluid pressure operated diaphragm or plate arranged in the chamber 4, as customary in this class of apparatus. The parts thus far described constitute no part of the invention and are shown in order to give a comprehensive understanding of the purpose and construction of the improvement.

5 designates a casing which may be mounted in any manner conveniently to the arrangement of the other parts of the system, and contains the indicating and regulating instrumentalities that will now be explained. Arranged within the casing 5 is a fluid pressure supply pipe 6 which is adapted to be connected with the main valve diaphragm chamber 4 as by a pipe 7. The pipe 6 is connected with a supplemental fluid pressure supply pipe 8 which contains a supply of air or other fluid under pressure acting to determine the position of the main valve 3 in accordance with the pressure within the tank 1 as will be described. Arranged within the pipe 6 in the casing is a valve which is preferably located in a valve body 9.

The valve is indicated at 10, arranged on a reciprocatory stem 11, controlled by a spring 12 and acting when closed to prevent the passage of fluid pressure into the pipe 7. When the pressure within the tank 1 increases, the valve stem 11 is operated to open the valve, and release fluid pressure into the pipe 7 and diaphragm chamber 4, thus closing the main valve, and this operation is effected in the following manner: Arranged within the casing 5 are means controlled by the fluid pressure to be regulated including an actuating lever 13 which is in operative engagement with a diaphragm or plate operated by pressure within the tank passing through a pipe 14, and pipe 15 arranged within the casing. As the pressure increases the lever 13 is moved and operates the valve 10 against the action of spring 12. It is desirable to provide for having the valve 10 operate at different pressures, and to this end we mount an adjustable member on the lever 13, preferably in the form of a rotary cam 16. The cam 16 is carried by a sleeve 17 provided with an indicator 18 coöperating with a scale 19 on the indicating plate or cover 20, so that by turning the indicator 18 to any desired point, the cam 16 is set, causing the valve 10 to be opened and the main valve 3 to be closed accordingly when the pressure in the tank reaches the predetermined point. It is also the purpose of the improvement to give an indication of the pressure in the tank 1 at all times, without requiring a separate unit for this purpose, and in order to accomplish this in the most efficient and economical manner the indicator 21 is arranged within the casing 5 already mentioned, coöperating with the indicating scale 22 on the cover plate. The indicator 21 is fixed on a spindle 23, carrying a pinion that is engaged by a gear segment 24, the spindle 23 being returned to its normal position by a spring 25. The gear segment 24 is mounted on an arm which pivots about the axis 26 and adjustably connected to the arm is a plate 27 pivoted at 28 to a link 29 which in turn is connected at 30 to the lever 13 already mentioned. The adjustable relation between gear segment 24 and plate 27 is provided in order to vary the amount of movement of the indicator with relation to the actuating lever in order to get the proper adjustment.

It will be seen that the structure affords a reliable means that assures an accurate indication of the pressure in the tank at any time, which indication will always be directly in accordance with the position of the actuating lever 13, the parts being combined in such a manner as to give this twofold result in a unit structure, embodying few parts encompassed in a small space.

We claim as our invention:

1. In a combined pressure indicating and regulating device, the combination with a casing, of an indicator movably arranged in the casing, a pipe arranged in the casing and adapted to receive a pressure supply for controlling a valve governing the pressure to be regulated, a valve located in said pipe within the casing, and means disposed in the casing controlled by the pressure to be regulated and operatively connected to said indicator and to the supplemental valve.

2. In a combined pressure indicating and regulating device, the combination with a casing, of an indicator movably arranged in the casing, a pipe arranged in the casing and adapted to receive a pressure supply for controlling a valve governing the pressure to be regulated, a valve located in said pipe within the casing, an actuating lever arranged within the casing controlled by the pressure to be regulated, and operative connections between the lever and the indicator and between the lever and the last mentioned valve.

3. In a combined pressure indicating and regulating device, the combination with a casing, of an indicator movably arranged in the casing, a pipe arranged in the casing and adapted to receive a pressure supply for controlling a valve governing the pressure to be regulated, a valve located in said pressure supply pipe within the casing, and means actuated by the pressure to be regulated and arranged within the casing including an actuating lever, and connections between said lever and the indicator and between the lever and the last mentioned valve.

4. In a combined pressure indicating and regulating device, the combination with a casing, of an indicator movably arranged in the casing, a pipe arranged in the casing and adapted to receive a pressure supply for controlling a valve governing the pressure to be regulated, a valve located in said pipe within the casing, means disposed in the casing controlled by the pressure to be regulated, operative connections between said means and the last mentioned valve including an adjustable device acting to vary the movement of the valve, and operative connections between said means and the indicator.

5. In a combined pressure indicating and regulating device, the combination with a casing, of an indicator movably arranged in the casing, a pipe arranged in the casing and adapted to receive a pressure supply for controlling a valve governing the pressure to be regulated, a valve located in said pipe within the casing and mounted on a movable valve stem, means controlled by the pressure to be regulated including an actuating lever arranged within the casing, a rotatably adjustable cam on the lever having engagement with said valve stem and operating the latter in accordance with its position on the lever, and operative connections between the lever and the aforesaid indicator.

HENRY W. MAURER.
FRED K. TAYLOR.

Witnesses:
H. E. STONEBRAKER,
RUSSELL B. GRIFFITH.